United States Patent [19]

Dobreski

[11] Patent Number: 5,682,730
[45] Date of Patent: Nov. 4, 1997

[54] PLASTIC BAG WITH BOTTOM HEADER

[75] Inventor: David V. Dobreski, Fairport, N.Y.

[73] Assignee: Tenneco Packaging, Evanston, Ill.

[21] Appl. No.: 713,170

[22] Filed: Sep. 12, 1996

[51] Int. Cl.⁶ ............................................. B65D 33/16
[52] U.S. Cl. ...................... 53/469; 206/554; 383/9; 383/67; 493/194
[58] Field of Search ................ 206/554; 383/9, 383/67; 53/459, 469; 493/194

[56] References Cited

U.S. PATENT DOCUMENTS

| | | | |
|---|---|---|---|
| 2,677,376 | 5/1954 | Brunner | 129/1 |
| 2,807,265 | 9/1957 | Oliva et al. | 129/1 |
| 2,878,849 | 3/1959 | Lingenfelter et al. | 150/5 |
| 2,971,874 | 2/1961 | Canno | 383/9 |
| 3,070,278 | 12/1962 | Korn | 383/9 |
| 3,089,635 | 5/1963 | Kugler | 383/9 |
| 3,126,094 | 3/1964 | Arnold et al. | 206/554 |
| 3,208,660 | 9/1965 | Brieske | 383/9 |
| 3,300,120 | 1/1967 | McColgan | 383/9 |
| 3,554,435 | 1/1971 | Martinez | 383/9 |
| 3,765,597 | 10/1973 | Brieske | 383/9 |
| 3,974,958 | 8/1976 | Ruda | 383/9 |
| 4,290,467 | 9/1981 | Schmidt | 150/3 |
| 4,615,045 | 9/1986 | Siegel | 383/5 |
| 4,713,839 | 12/1987 | Peppiatt | 383/41 |
| 4,715,728 | 12/1987 | Sfikas | 383/9 |
| 4,769,126 | 9/1988 | Roen et al. | 206/554 |
| 4,787,755 | 11/1988 | Branson | 383/65 |
| 4,832,505 | 5/1989 | Ausnit et al. | 383/5 |
| 4,948,267 | 8/1990 | Kaldenbaugh | 383/63 |
| 4,957,571 | 9/1990 | Cipolla | 156/66 |
| 5,067,208 | 11/1991 | Herrington, Jr. et al. | 24/400 |
| 5,067,822 | 11/1991 | Wirth et al. | 383/61 |
| 5,077,064 | 12/1991 | Hustad et al. | 426/106 |
| 5,100,000 | 3/1992 | Huseman | 206/554 |
| 5,405,629 | 4/1995 | Marnocha et al. | 426/122 |
| 5,417,040 | 5/1995 | Davoren | 53/455 |
| 5,417,495 | 5/1995 | Branson | 383/63 |
| 5,419,437 | 5/1995 | Huseman | 206/554 |
| 5,480,230 | 1/1996 | May | 383/9 |
| 5,525,363 | 6/1996 | Herber et al. | 426/130 |
| 5,529,394 | 6/1996 | Davoren | 383/61 |

FOREIGN PATENT DOCUMENTS

| | | | |
|---|---|---|---|
| 521618 | 1/1993 | European Pat. Off. | |
| 1073913 | 6/1967 | United Kingdom | 383/9 |

*Primary Examiner*—Stephen P. Garbe
*Attorney, Agent, or Firm*—Arnold, White & Durkee

[57] ABSTRACT

A plastic bag comprises first and second opposing panels fixedly connected to each other along a pair of sides, a primary bottom, and a secondary bottom. The primary and secondary bottoms extend between the pair of sides. The sides and the secondary bottom define a receptacle space having a mouth formed opposite the secondary bottom. The plastic bag further comprises a bottom header disposed between the primary and secondary bottoms and including first and second opposing header panels. The first header panel is extruded with and extends downward from the first body panel. The second header panel is extruded with and extends downward from the second body panel. The bottom header includes an opening for mounting the plastic bag to a dispensing post.

18 Claims, 3 Drawing Sheets

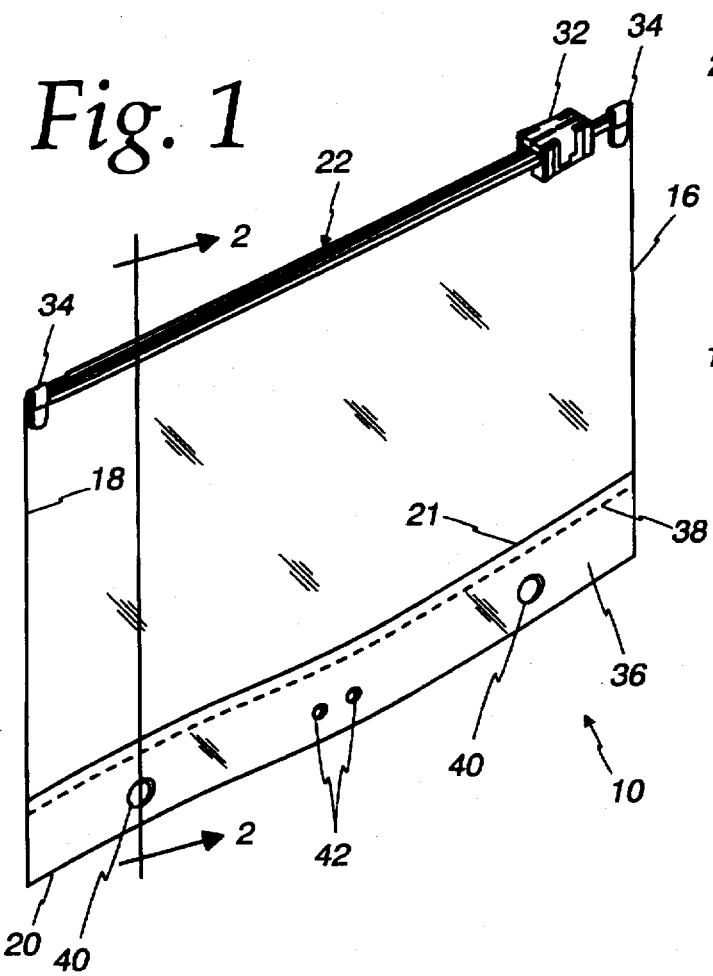
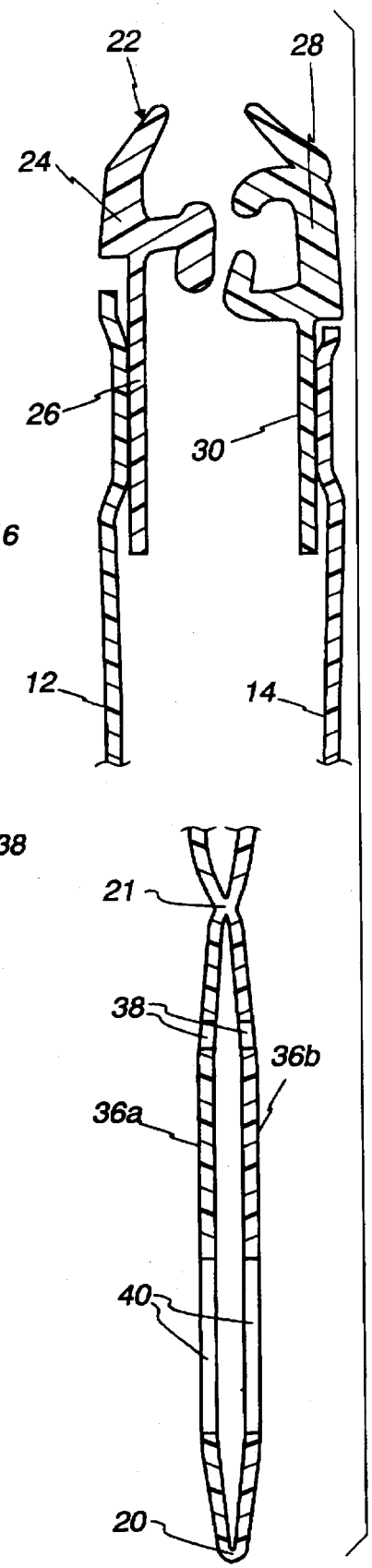

PLASTIC BAG WITH BOTTOM HEADER

FIELD OF THE INVENTION

The present invention generally relates to plastic bags and, more particularly, to a plastic bag having a bottom header for mounting the bag to dispensing posts.

BACKGROUND OF THE INVENTION

A plastic bag typically includes first and second opposing panels fixedly connected to each other along a pair of sides and a bottom bridging the pair of sides. The first and second panels are not fixedly connected along a mouth which is formed opposite to the sealed bottom. Rather, the bag may be provided with a zipper extending along the mouth of the plastic bag. The zipper includes a male track with a male profile and a female track with a female profile. The male and female profiles are releasably engageable to each other to allow the bag to be opened and closed.

Such plastic bags are commonly used by deli clerks in grocery stores to package cheese and deli meats sold to consumers. To facilitate handling of the plastic bags by the deli clerks, the plastic bags often include a top header extending upward from the reclosable zipper, and the top header includes one or more holes for mounting the plastic bag to dispensing posts. The plastic bags are typically mounted to the dispensing posts in bag packs consisting of a predetermined number of bags.

Some types of reclosable plastic bags, such as the type disclosed in U.S. Pat. No. 5,067,208 to Herrington, Jr. et at, are not ideally suited to the use of top headers for mounting the bags due to the thickness of the reclosure feature on the bags. For example, the reclosure feature of the bag disclosed in U.S. Pat. No. 5,067,208 includes a relatively thick zipper and a slider for opening and closing the zipper. If a pack of such plastic bags were to be mounted to dispensing posts using top headers, the bag pack would be overly imbalanced and bulky.

A need therefore exists for a plastic bag that facilitates mounting, handling, and filling thereof.

SUMMARY OF THE INVENTION

The plastic bag comprises first and second opposing panels fixedly connected to each other along a pair of sides and a bottom bridging the pair of sides. The bag is preferably provided with a reclosable fastener such as a zipper extending along a mouth formed opposite the sealed bottom of the plastic bag. To facilitate mounting, handling, and filling of the plastic bag, the bag includes a bottom header extending downward from the bottom. The bottom header includes one or more openings in the form of holes, slits, or the like for mounting the plastic bag to dispensing posts. The term "dispensing post" or "dispensing posts" as used herein shall include any rod, pole, shaft, pin, wicket, support, rack, or the like on which the bottom header can be mounted. The bottom header preferably includes a preferential area of weakness such as a perforation line.

The plastic bag is preferably mounted to the dispensing post with the reclosable fastener in an open position such that the bag mouth is open. To fill the plastic bag with a food product, the food product is inserted into the plastic bag via the open mouth and the plastic bag is then closed using the reclosable fastener. The plastic bag is then removed from the dispensing posts by tearing the bag along the preferential area of weakness.

BRIEF DESCRIPTION OF THE DRAWINGS

Other objects and advantages of the invention will become apparent upon reading the following detailed description and upon reference to the drawings in which:

FIG. 1 is an isometric view of a plastic bag embodying the present invention;

FIG. 2 is a sectional view taken generally along line 2—2 in FIG. 1;

Figure 3:
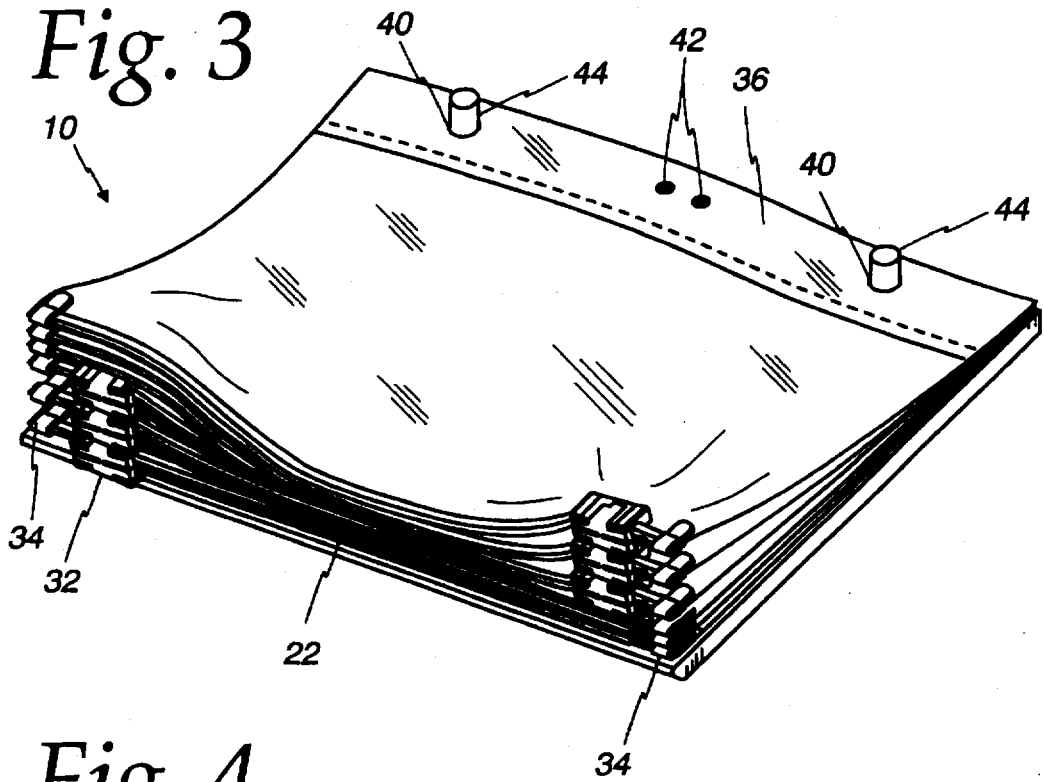
FIG. 3 is an isometric view of a pack of plastic bags mounted to dispensing posts.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Turning now to the drawings, FIGS. 1 and 2 depict a plastic bag embodying the present invention. The plastic bag 10 comprises first and second opposing body panels 12 and 14 fixedly connected to each other along a pair of sides 16 and 18, a primary bottom 20, and a secondary bottom 21. The primary and secondary bottoms 20 and 21 extend between the pair of sides 16 and 18.

The bag 10 preferably includes a reclosable fastener such as a zipper 22 extending along a mouth formed opposite the bottoms 20 and 21 of the plastic bag 10. The zipper 22 includes a male track and a female track. The male track includes a male profile 24 and a first depending fin or flange 26 extending downward from the male profile 24. Likewise, the female track includes a female profile 28 and a second depending fin or flange 30 extending downward from the female profile 28. The first and second fins 26 and 30 are thermally fused to inner surfaces of the respective first and second body panels 12 and 14. Alternatively, the zipper 22 may be extruded with the body panels 12 and 14 such that the first fin 26 is integrally formed with the first body panel 12 and the second fin 30 is integrally formed with the second body panel 14.

To assist in opening the plastic bag, a slider 32 is slidably mounted to the zipper 22 for movement between a closed position and an open position. In the open position of the slider 32 shown in FIGS. 1 and 2, the male and female profiles 24 and 28 are disengaged from each other so that a user can gain access to the interior of the plastic bag 10. Movement of the slider 32 from the open position in FIGS. 1 and 2 to the closed position in FIG. 5 interlocks the male and female profiles 24 and 28 so as to restrict access to the interior of the plastic bag 10.

End termination clamps 34 are mounted to opposite ends of the zipper 22. The clamps 34 prevent the slider 32 from going past the ends of the zipper 22 and hold the male and female profiles 24 and 28 together to resist stresses applied to the profiles during normal use of the plastic bag 10. Further details concerning the construction and operation of the slider 32 and the end clamps 34 may be obtained from U.S. Pat. No. 5,067,208 to Herrington, Jr. et at., which is incorporated herein by reference in its entirety.

To facilitate mounting, handling, and filling of the plastic bag 10, the bag 10 includes a bottom header 36 disposed between the secondary bottom 21 and the primary bottom 20. The header 36 includes a first and second opposing header panels 36a and 36b. The first header panel 36a is extruded with and extends downward from the first body panel 12. The second header panel 36b is extruded with and extends downward from the second body panel 14. To permit the first and second header panels 36a and 36b to be detached from the remainder of the plastic bag 10, the first and second header panels 36a and 36b are detachably connected to the respective first and second body panels 12 and 14 along respective preferential areas of weakness in the form of perforation lines 38. The perforation lines 38 are parallel to and located slightly below the secondary bottom 21. The first and second header panels 36a and 36b are integrally joined to each other along the primary bottom 20. To permit the plastic bag 10 to be mounted to dispensing posts, the bottom header 36 includes a pair of spaced openings 40. The openings 40 may be in the form of holes, slits, or the like.

A plurality of plastic bags 10 are preferably formed into convenient unitary packs for shipping and loading onto dispensing posts. This can be done by stacking the bags into a predetermined plurality, and then assembling them into a unitary pack by penetrating the stack with a heated or ultrasonic pin or punch element to form apertures 42. The bags in the pack are heat-welded or ultrasonically-welded together along the peripheries of the apertures 42. To maintain the integrity of the bag pack during shipping, the bag pack may be mounted to dispensing posts in the form of wickets prior to shipment.

Figure 4:
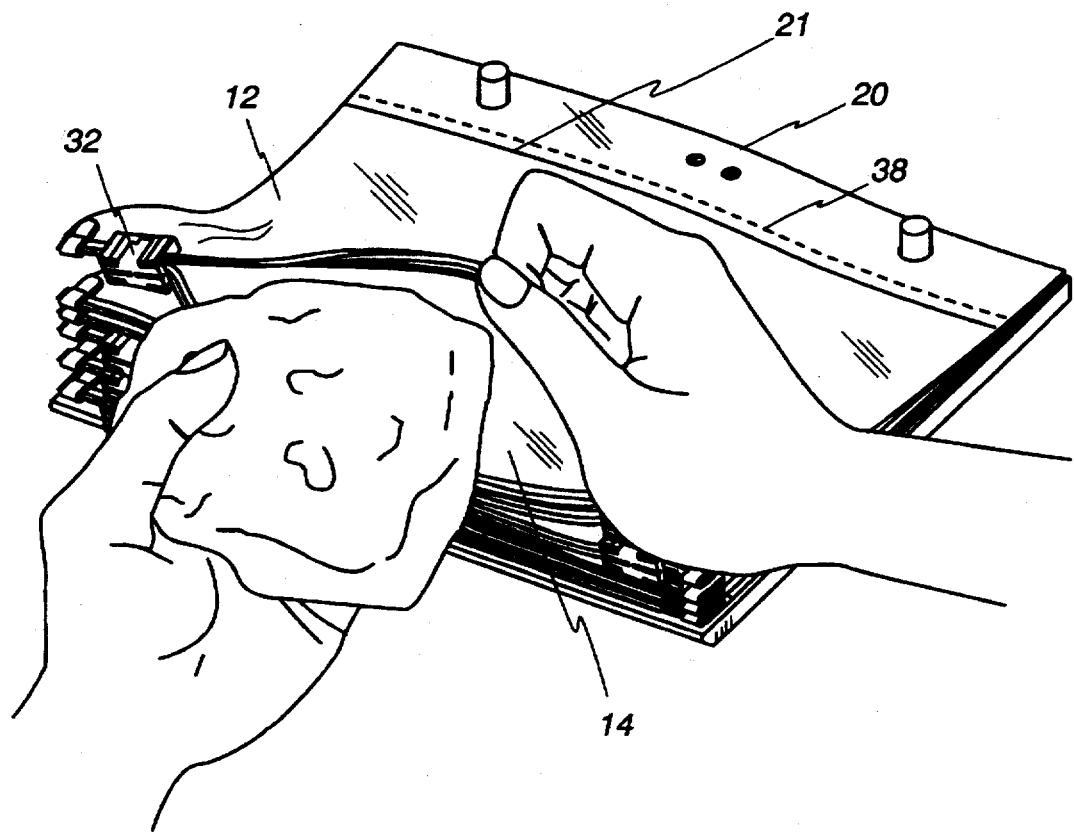
FIG. 4 is an isometric view of the pack of plastic bags in FIG. 3 showing a first bag in the pack being filled with a food product.
Figure 5:
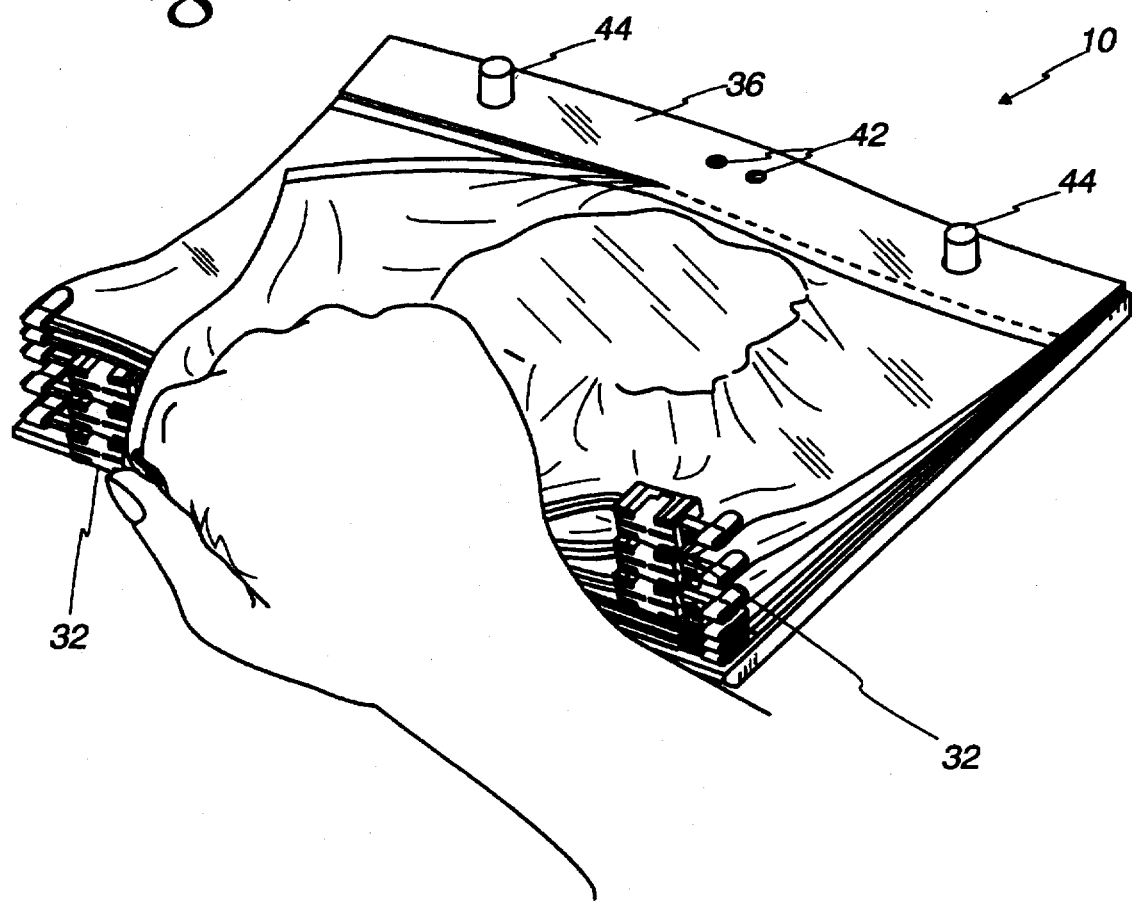
FIG. 5 is an isometric view of the pack of plastic bags in FIG. 3 showing the first bag in the pack being torn along a preferential area of weakness and removed from the dispensing posts.

FIGS. 3, 4, and 5 depict a typical method of mounting, handling, and filling a plastic bag 10 contained in a unitary pack of bags. FIG. 3 depicts the unitary pack of bags mounted to dispensing posts 44 with the slider 32 in the open position. The bags are reversed or upside down in orientation relative to prior art bags, which have top headers. The dispensing posts 44 protrude through the openings 40 formed in the bottom header 36 of each bag 10. The use of the bottom header 36 instead of a top header allows the pack of bags to be fairly compact and balanced and maintains the integrity of the bag stack. Referring to FIG. 4, to fill the first plastic bag 10 with a food product, the opposing body panels 12 and 14 are separated from each other at the mouth end of the bag 10. After the food product is inserted into the plastic bag 10 via the open mouth, the filled plastic bag 10 is closed by moving the slider 32 to the closed position so as to engage the profiles of the zipper 22. Referring to FIG. 5, a filled portion of the plastic bag 10 is removed from the dispensing posts 44 by tearing the bag 10 along the perforation lines 38. The bottom header 36, on the other hand, remains mounted to the dispensing posts 44. The plastic bag 10 is particularly adapted for use in delis, where a deli clerk can load meat or cheese slices into the bag 10 while it is mounted to dispensing posts, remove the filled portion of the bag 10 from the dispensing posts, and then give the filled portion of the bag 10 to a customer.

The plastic bag 10 is formed from a single sheet of plastic film that is folded over onto itself along a fold line. One half of the folded plastic sheet forms the first body panel 12 and the first header panel 36a, and the other half of the folded plastic sheet forms the second body panel 14 and the second header panel 36b. The fold line forms the primary bottom 20 of the plastic bag 10. To create the secondary bottom 21, the inner surfaces of the first and second opposing body panels 12 and 14 are thermally fused to each other along a seal line parallel to and spaced away from the fold line that forms the primary bottom 20. The perforation lines 38 are applied slightly below the secondary bottom 21 at a location between the secondary bottom 21 and the primary bottom 20. The sides 16 and 18 are formed by thermally fusing the first body panel 12 and the first header panel 36a to the respective second body panel 14 and the second header panel 36b along side seal lines generally perpendicular to the primary and secondary bottoms 20 and 21. The distance between the side seal lines defines the width of the plastic bag 10. The sealed sides 16 and 18 and the secondary bottom 21 define a receptacle space having a mouth formed opposite the secondary bottom 21. The plastic bag 10 is optionally provided with the zipper 22, slider 32, and clamps 34, which may be applied to the plastic bag as disclosed in U.S. Pat. No. 5,067,208.

While the present invention has been described with reference to one or more particular embodiments, those skilled in the art will recognize that many changes may be made thereto without departing from the spirit and scope of the present invention. For example, the zipper 22 may be replaced with a different reclosable fastener such as a resealable adhesive-type closure. Further, the openings 40 may be eliminated and the apertures 42 may be used to mount the plastic bag 10 to dispensing posts. Also, the perforation lines 38 may be eliminated so that the bag 10 is removed from the dispensing posts either by lifting the bag off the posts or by tearing through the plastic material between openings 40 and the primary bottom 20. To facilitate the latter, the openings 40 may be positioned closer to the primary bottom 20 and/or configured as slits oriented perpendicular to the primary bottom 20. Moreover, one of the header panels 36a and 36b may be eliminated so that the header 36 includes only a single panel. Each of these embodiments and obvious variations thereof is contemplated as falling within the spirit and scope of the claimed invention, which is set forth in the following claims.

What is claimed is:

1. A plastic bag, comprising:
   first and second opposing body panels fixedly connected to each other along a pair of sides and an ungussetted bottom bridging said pair of sides, said sides and said bottom defining a receptacle space having a mouth formed opposite said bottom;
   a reclosable fastener extending along said mouth; and
   a bottom header including a first header panel extending downward from said first body panel, said bottom header including an opening for mounting the plastic bag to a dispensing post, said bottom header including one or more tearable areas that allow the plastic bag to be substantially removed from said dispensing post in response to being broken.

2. The plastic bag of claim 1, wherein said bottom header includes a second header panel extending downward from said second body panel, said opening being formed in said first and second header panels.

3. The plastic bag of claim 2, wherein said first and second header panels are extruded with said respective first and second body panels.

4. The plastic bag of claim 3, wherein said tearable areas are preferential areas of weakness, and wherein said first and second header panels are detachably connected to said respective first and second body panels along said preferential areas of weakness.

5. The plastic bag of claim 4, wherein said preferential areas of weakness include perforation lines generally parallel to said bottom.

6. The plastic bag of claim 1, wherein said reclosable fastener includes a zipper and a slider mounted to said zipper for movement between a closed position and an open position, said zipper having a first track with a first profile and a second track with a second profile, said first and second profiles being releasably engageable to each other, said first and second profiles being engaged to each other while said slider is in said closed position, said first and second profiles being disengaged from each other in response to movement of said slider from said closed position to said open position.

7. A plastic bag, comprising:
   first and second opposing panels fixedly connected to each other along a pair of sides, a primary bottom, and a secondary bottom, said primary and secondary bottoms extending between said pair of sides, said sides and said secondary bottom defining a receptacle space having a mouth formed opposite said secondary bottom;
   a reclosable fastener extending along said mouth; and
   a bottom header disposed between said primary and secondary bottoms and including first and second opposing header panels, said first header panel being extruded with and extending downward from said first body panel, said second header panel being extruded with and extending downward from said second body panel, said bottom header being free of reinforcing filler material between said first and second header panels, said bottom header including an opening for mounting the plastic bag to a dispensing post, said bottom header including one or more tearable areas that allow the plastic bag to be substantially removed from said dispensing post in response to being broken.

8. The plastic bag of claim 7 wherein said first and second body panels are thermally fused to each other along a seal line parallel to and spaced away from said primary bottom to form said secondary bottom.

9. The plastic bag of claim 8, wherein said first and second header panels are integrally joined to each other along said primary bottom.

10. The plastic bag of claim 7, wherein said tearable areas are preferential areas of weakness, and wherein said first and second header panels are detachably connected to said respective first and second body panels along said respective preferential areas of weakness.

11. The plastic bag of claim 10, wherein said preferential areas of weakness include perforation lines generally parallel to said bottom.

12. The plastic bag of claim 7, wherein said reclosable fastener includes a zipper and a slider mounted to said zipper for movement between a closed position and an open position, said zipper having a first track with a first profile and a second track with a second profile, said first and second profiles being releasably engageable to each other, said first and second profiles being engaged to each other while said slider is in said closed position, said first and second profiles being disengaged from each other in response to movement of said slider from said closed position to said open position.

13. In a plastic bag including first and second opposing panels fixedly connected to each other along a pair of sides and a bottom bridging said pair of sides, said sides and said bottom defining a receptacle space having an open mouth formed opposite said bottom; a reclosable fastener extending along said mouth; and a bottom header having a first header panel extending downward from said first body panel and having one or more tearable areas, said bottom header having an opening, a method of using said plastic bag comprising the steps of:
   mounting said plastic bag to a dispensing post with said dispensing post protruding through said opening;
   inserting a product into said plastic bag via said open mouth;
   closing said mouth by closing said reclosable fastener; and
   removing said plastic bag from said dispensing post by breaking said bottom header along said one or more tearable areas.

14. The method of claim 13, wherein said first body panel is detachably connected to said first body panel along a first preferential area of weakness, and wherein said bottom header includes a second header panel extending downward from said second body panel and detachably connected to said second body panel along a second preferential area of weakness, said opening being formed in said first and second header panels, said first and second preferential areas of weakness forming said tearable areas, and wherein said step of removing said plastic bag from said dispensing post includes detaching said first and second body panels from said respective first and second header panels along said respective first and second preferential areas of weakness.

15. The method of claim 13, wherein said tearable areas are preferential areas of weakness.

16. A unitary pack of plastic bags, each of said bags comprising
   first and second opposing body panels fixedly connected to each other along a pair of sides and a bottom bridging said pair of sides, said sides and said bottom defining a receptacle space having a mouth formed opposite said bottom;
   a reclosable fastener extending along said mouth; and
   a bottom header including a first header panel extending downward from said first body panel, said bottom header including an opening for mounting the plastic bag to a dispensing post, said bottom header including one or more tearable areas that allow the plastic bag to be substantially removed from said dispensing post in response to being broken;
   the bottom headers of adjacent ones of said bags being welded together to form the unitary pack.

17. A method of manufacturing a plastic bag, comprising the steps of:
   providing a sheet of plastic film;
   folding said plastic sheet over onto itself along a fold line to form first and second opposing panels, said fold line forming a primary bottom of the plastic bag;
   sealing said first and second opposing panels to each other along a first seal line generally parallel to and spaced away from said fold line, said first seal line forming a secondary bottom of the plastic bag, a bottom header being defined by portions of said first and second opposing panels extending between said primary and secondary bottoms, said bottom header being free of reinforcing filler material between said portions of said first and second opposing panels;
   sealing said first and second opposing panels to each other along second and third seal lines, said second and third seal lines being generally parallel to and spaced away from each other and being generally perpendicular to said first seal line, said second and third seal lines forming a pair of sides of the plastic bag, said primary and secondary bottoms extending between said pair of sides, said sides and said secondary bottom defining a receptacle space having a mouth formed opposite said secondary bottom;

forming an opening in said bottom header for mounting the plastic bag to a dispensing post;

providing said bottom header with one or more tearable areas that allow the plastic bag to be substantially removed from said dispensing post in response to being broken; and applying a reclosable fastener along said mouth.

18. A plastic bag, comprising:

first and second opposing body panels fixedly coveted to each other along a pair of sides and ungussetted bottom bridging said pair of sides, said sides and said bottom defining a receptacle space having a mouth formed opposite said bottom;

a reclosable fastener extending along said mouth; and a bottom header consisting of only one header panel extending downward from said first body panel, said header panel including an opening for mounting the plastic bag to a dispensing post, said header panel including one or more tearable areas that allow the plastic bag to be substantially removed from said dispensing post in response to being broken.

* * * * *